United States Patent [19]

Moench

[11] Patent Number: 5,705,748
[45] Date of Patent: Jan. 6, 1998

[54] METHOD AND APPARATUS FOR DETERMINING THE ROTARY ANGULAR POSITION OF A ROTARY MEMBER WHEN MEASURING UNBALANCE

[75] Inventor: Uwe Moench, Bensheim, Germany

[73] Assignee: Hofmann Maschinenbau GmbH, Pfungstadt, Germany

[21] Appl. No.: 299,329

[22] Filed: Aug. 31, 1994

Related U.S. Application Data

[63] Continuation of Ser. No. 819,807, Jan. 13, 1992, abandoned.

[30] Foreign Application Priority Data

Feb. 15, 1991 [DE] Germany .................. 41 04 694.3

[51] Int. Cl.⁶ .................. G01M 4/26; G01M 1/38
[52] U.S. Cl. .................. 73/462; 73/460; 324/207.25; 364/565
[58] Field of Search .................. 73/460, 462, 464; 324/207.22, 207.25; 364/565

[56] References Cited

U.S. PATENT DOCUMENTS

| | | | |
|---|---|---|---|
| 3,854,339 | 12/1974 | Müller | 73/462 |
| 4,214,481 | 7/1980 | Reutlinger | 73/462 |
| 4,506,339 | 3/1985 | Kühnlein | 73/462 |
| 5,125,271 | 6/1992 | Hallberg | 73/462 |

FOREIGN PATENT DOCUMENTS

| | | | |
|---|---|---|---|
| 608345 | 11/1960 | Canada | 73/462 |
| 2243002 | 11/1973 | Germany | |

OTHER PUBLICATIONS

Gunter Junck, Messverfahren und Messgerate der Hofmann-Auswuchtmaschinen, Hofmann News No. 5, pp. 1-8.

Gunther Himmler, Die Festigkeitsprufung von Schweiben- und Speichenradern, Hofmann News No. 9, pp. 1-16.

Peter Drust, Automatische Auswuchtung von Elektromotorenankern, Hofmann News No. 14, pp. 1-8.

*Primary Examiner*—Hezron E. Williams
*Assistant Examiner*—Helen C. Kwok
*Attorney, Agent, or Firm*—Cushman Darby & Cushman Intellectual Property Group of Pillsbury Madison & Sutro LLP

[57] ABSTRACT

In a method and apparatus for determining the rotary angular position of a rotary member when measuring unbalance on the rotary member, during an unbalance measuring run the rotary member is twice sensed in the peripheral direction in a given succession in respect of time, resulting in the formation of first and second angle signals which are displaced in respect of time. The two signals are stored, having regard to their spacing in respect of time. The two signals are evaluated for rotating the rotary member, in dependence on the measured angular position of an unbalance, into a balancing position for carrying out a balancing operation on the rotary member.

10 Claims, 5 Drawing Sheets

5,705,748

METHOD AND APPARATUS FOR DETERMINING THE ROTARY ANGULAR POSITION OF A ROTARY MEMBER WHEN MEASURING UNBALANCE

This is a continuation of application Ser. No. 07/819,807, filed on Jan. 13, 1992, which was abandoned upon the filing hereof.

BACKGROUND OF THE INVENTION

Various forms of method and apparatus for determining the rotary angular position of a rotary member are known, which involve sensing the rotary member in the peripheral direction during an unbalance measuring run, and producing on the basis of that operation, in each revolution of the rotary member, an angle signal which is related to the rotary member and which identifies given angular spacings thereon. In that respect reference may be made to German published specification (DE-AS) No 22 43 002 and Hofmann News 14 'Automatische Auswuchtung yon Elektromotorenankern' ['Automatic balancing of electric motor amatures'] (imprint 10.88). In that procedure, balancing locations which are acceptable for mass balancing of the rotary member are sensed at the periphery thereof, pulses which are associated with the balancing locations are generated and a pulse is obtained, to constitute a phase reference signal, from the number of pulses which are counted during one revolution of the rotary member, in the measuring run. The phase reference signal is then used to stop the rotary member in a defined position.

SUMMARY OF THE INVENTION

An object of the present invention is to provide a method of determining the rotary angular position of a rotary member when measuring unbalances, which is of enhanced efficiency and greater operational reliability.

Another object of the present invention is to provide a method of determining the rotary angular position of a rotary member when measuring unbalance thereof, which is such as to permit measurement of an unbalance and to stop the rotary member to be balanced at the correct angular positioning for balancing thereof, without requiring external aids for moving the rotary member into the correct position.

Still another object of the present invention is to provide an apparatus for determining the rotary angular position of a rotary member when measuring unbalance, which affords reliable results which are less likely to be falsified due to the apparatus design.

In accordance with the present invention the foregoing and other objects are attained by a method of determining the rotary angular position of a rotary member when measuring unbalance thereof, which comprises sensing the rotary member in the peripheral direction during an unbalance measuring run. An angle signal which is related to the rotary member and which identifies given angular spacings thereon is formed in each revolution of the rotary member. The periphery of the rotary member is sensed twice in a given succession in respect of time and two angle signals which are displaced in respect of time are formed. The two angle signals are stored, having regard to their spacing in respect of time. The two angle signals are then evaluated for rotating the rotary member, in dependence on the measured angular position of unbalance, into a balancing position for carrying out a balancing operation.

In the apparatus aspect of the present invention, the foregoing and other objects are attained by an apparatus for determining the rotary angular position of a rotary member in an unbalance measuring arrangement, comprising a sensing means for sensing the rotary member in the peripheral direction and adapted to produce in each revolution of the rotary member angle signal which are related to the rotary member to be measured and which identify given angular spacings in respect thereof. The sensing means comprises first and second sensors which are arranged at an angular spacing from each other in the peripheral direction of the rotary member and each of which is adapted to produce a rotary member-related angle signal. The apparatus further includes a storage means for storage of the first and second angle signals from the sensors, having regard to the angular spacing thereof, during an unbalance measuring run. An evaluation means is connected to the storage means and to the sensing means for comparison of the stored angle signals to the current angle signals which are supplied by the sensing means when the rotary member is being turned into an angle position for balancing thereof.

Advantageously, the procedure involved in accordance with the present invention provides for angular division of the rotary member in its peripheral direction or in its direction of rotation, during the measuring run, which is finer than the angular spacings between the features on the rotary member which are sensed by the sensors.

The procedure of the invention further provides that, when dealing with those rotary members which permit a balancing operation to be carried out thereon only in certain specific areas, for example by the removal of material from the rotary member by an operation such as grinding or milling, the rotary member is moved into a suitable angular position for operation thereof, relative to the tools for removing material from the rotary member to balance same.

The method and apparatus according to the invention are preferably used for balancing motor armatures and fan wheels or impellers, in particular those which are fixedly connected to a motor armature, as are used in fans or blowers employed in motor vehicles and the like.

In accordance with a preferred feature of the method of the invention, by triggering of the two angle signals it is possible to form pulses which identify shorter angular spacings which are related to the rotary member, than are predetermined by the features of the rotary member which are sensed to form the two angle signals, for example poles when dealing with electric motor armatures or blades when dealing with fan wheels or impellers.

In accordance with another preferred feature of the method of the invention, during the operation of turning the rotary member into the angular position for balancing thereof, the angular spacings which are formed during the unbalance measuring run from the two angle signals which are held in storage may be compared to the angle signals which are obtained by sensing the periphery of the rotary member during the operation of turning same into the angular position for balancing thereof and which specify the current angular position of the rotary member during that turning operation. That procedure provides precisely rotary member-related rotary angle information when the rotary reenter is being turned into the respective balancing position for carrying out the balancing operation itself.

When dealing with rotary members in which a mass compensation or balancing operation can be carried out only at certain predetermined balancing locations, for example when dealing with electric motor armatures or fan wheels or impellets or the like, the above-mentioned balancing locations on the rotary member are sensed in order to produce the angle signals. When dealing with electric motor armatures for example the balancing locations sensed on the rotary member may be the poles or pole shoes thereof, but it is also possible to sense the pole slots between the individual poles of the armature, for the purposes of producing the angle signals.

In a preferred feature of the apparatus in accordance with the principles of the invention the angular spacing between the first and second sensors is less than the angular spacing between the features which are sensed on the rotary member by the sensors. In addition to that angular spacing, the angular spacing between the first and second sensors may additionally involve an angular extent which corresponds to one or more times the angular spacing between the sensed features on the rotary member.

It is further possible for the angular spacing between the first and second sensors to be less than the angular distance over which a feature which is sensed on the rotary member extends, for example a pole of an electric motor armature. It is however possible for the angular spacing between the first and second sensors, in addition to that smaller angular distance, to involve an angular distance which corresponds to one or more times the angular spacing of the sensed features from each other on the rotary member.

When the rotary member is driven by an electric motor, in a preferred embodiment of the apparatus according to the invention, for the purposes of rotating the motor armature and the rotor coupled thereto into the balancing position, the electric motor may be actuated by way of a servo amplifier by an angle output signal from the evaluation means, and an unbalance angle signal, whereby the rotary member is stopped in the appropriate position for the balancing operation.

In that way, when dealing with rotary members such as fan wheels or impellers with their own drive, as are used for example in fans or blowers employed in motor vehicles, it is possible to measure the unbalance and then stop the rotary member to be balanced in the correct balancing position, by means of servo amplifiers, without requiring any external assembly for rotating the rotary member into the appropriate position for that operation. There are no slippage problems, as may occur for example when a rotary member is decelerated rapidly from a high speed of rotation.

Further objects, features and advantages of the present invention will be apparent from the following description of preferred embodiments.

DESCRIPTION OF PREFERRED EMBODIMENTS

Figure 1:
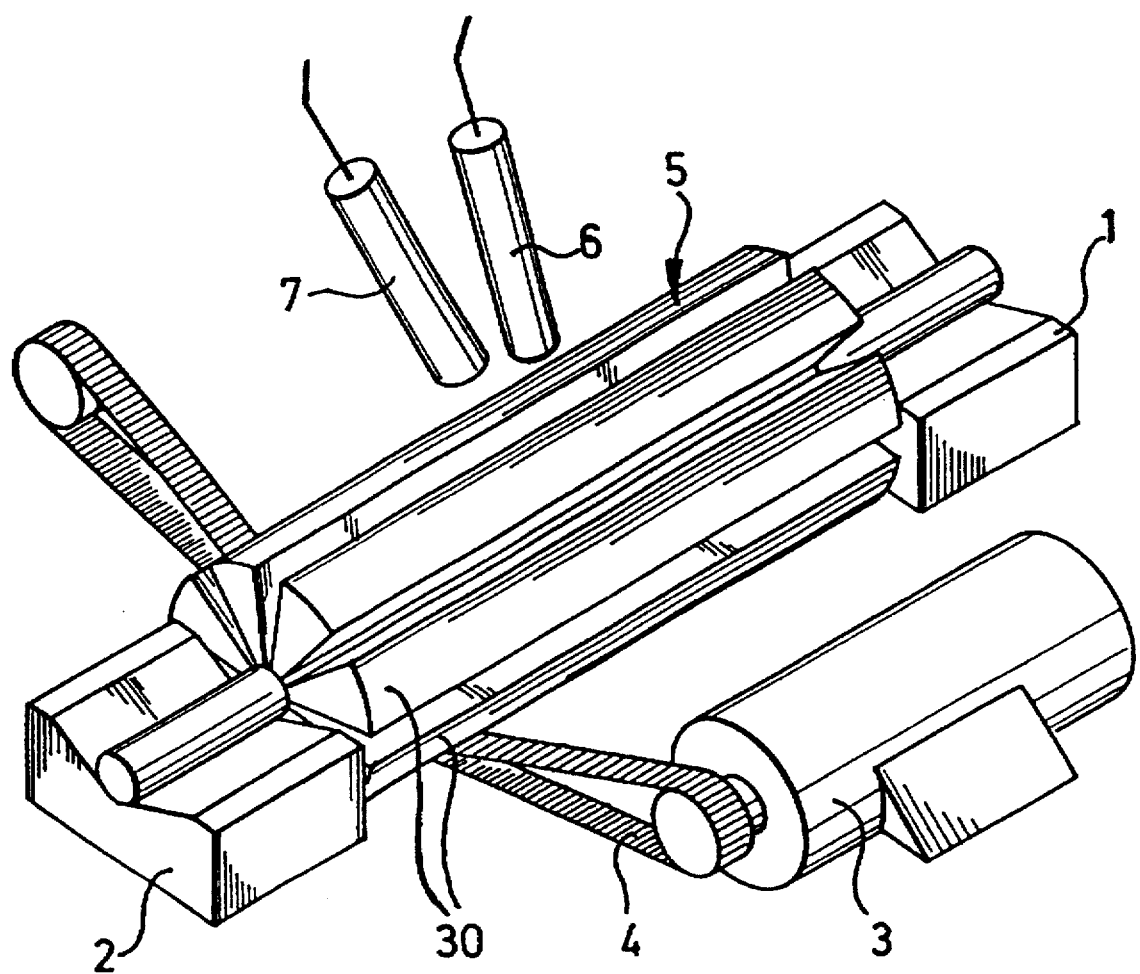
FIG. 1 is a diagrammatic view of an apparatus according to the invention showing a rotary member in the form of an electric motor armature disposed in an unbalance measuring apparatus having first and second sensors for sensing the periphery of the rotary member.

Referring firstly to FIG. 1, in the embodiment of the invention illustrated therein, a rotary member which is in the form of an electric motor armature is rotatably mounted in first and second mountings 1 and 2 of an unbalance measuring apparatus. Provided in the mounting assemblies 1 and 2 in known manner are force-measuring measurement value generators which are indicated at 31 and 32 in FIG. 2 and which are operable to measure centrifugal forces which are produced as a result of unbalance of the rotary member 5 in rotation thereof, during an unbalance measuring run. The FIG. 1 structure has a drive motor diagrammatically indicated at 3 for driving the rotary member 5 for a measuring run. The drive motor 3 drives the rotor 5 at a predetermined measuring speed of rotation for the measuring run by way of a drive belt 4 which bears tangentially against the peripheral surface of the rotary member 5 in the manner clearly shown in FIG. 1.

Reference numerals 6 and 7 in FIG. 1 indicate first and second sensors for sensing the periphery of the rotary member 5 in a non-contact mode. As indicated above, the rotary member 5 is shown in FIG. 1 in the form of an electric motor armature and, as can also be seen from FIG. 3, therefore has poles or pole pieces as indicated at 30 which are arranged at equal angular spacings from each other around the axis of rotation of the rotary member 5. An unbalance compensating operation, to balance the rotary member 5, can be carried out in the region of the pole pieces 30 as by the removal of material, for example by means of grinding or milling.

Figure 3:
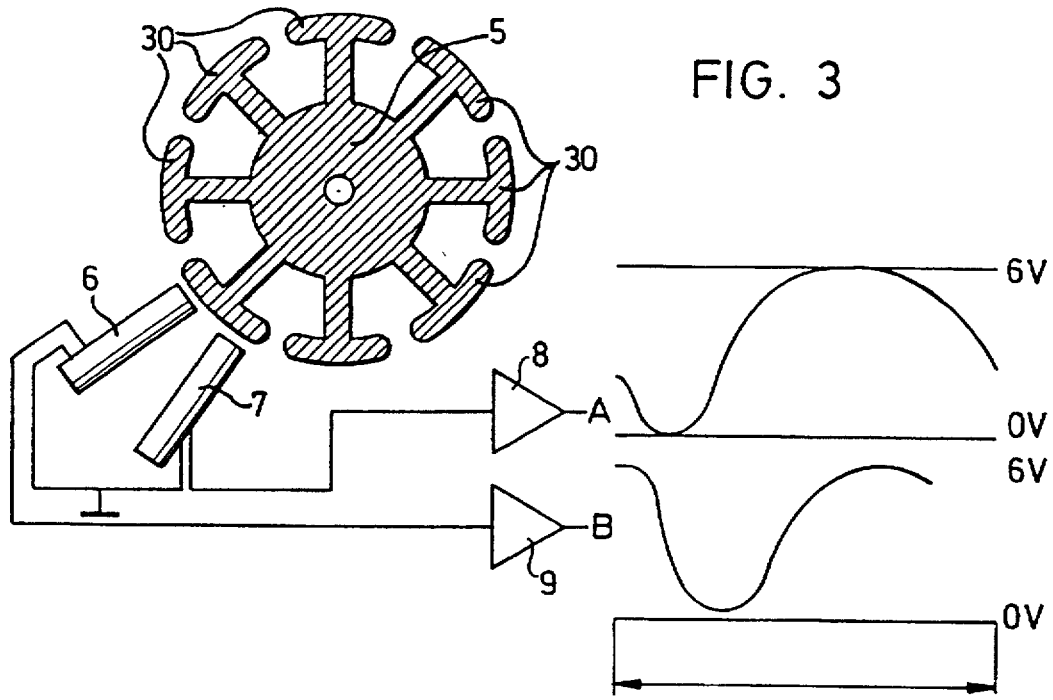
FIG. 3 is a diagrammatic view of the unbalance measuring apparatus shown in FIG. 1, including curves in respect of the analog output signals produced by the sensors.

As FIG. 3 shows, the first and second sensors 6 and 7 which can be inductive transmitters are at a given angular spacing from each other and, in dependence on inductive sensing of the respective pole pieces 30, generate output signals as are shown for example in FIG. 3 in respect of the angular distance over which a respective pole piece 30 extends. The output signals of the inductive sensors 6 and 7 are fed to amplifiers 8 and 9 for amplification thereof. The amplified output signals A and B appear at the outputs of the amplifiers 8 and 9. In the illustrated embodiment the amplified signals A and B have a peak voltage of for example about 6 V. The peak voltage approximately corresponds to the middle of a respective pole piece and then falls to about 0 V in the slot between two adjacent pole pieces 30. The two output signals of the sensors 6 and 7 have a phase difference as a result of the angular spacing between the two sensors 6 and 7 in the peripheral direction or the direction of rotation of the rotary member 5. While the rotary member 5 rotates, the pole pieces 30 are moved past the inductive sensors 6 and 7 and the two analog signals are thus produced with a corresponding phase difference.

In the configuration shown in FIG. 3, the angular spacing between the two sensors 6 and 7 is less than the angular distance over which a pole piece 30 on the rotary member 5 extends. It will be appreciated that it is also possible to increase that angular spacing by an integral multiple of the angular spacing of the respective pole pieces from each other, in order to obtain the desired phase difference in respect of the output signals produced by the first and second sensors 6 and 7.

Figure 4:
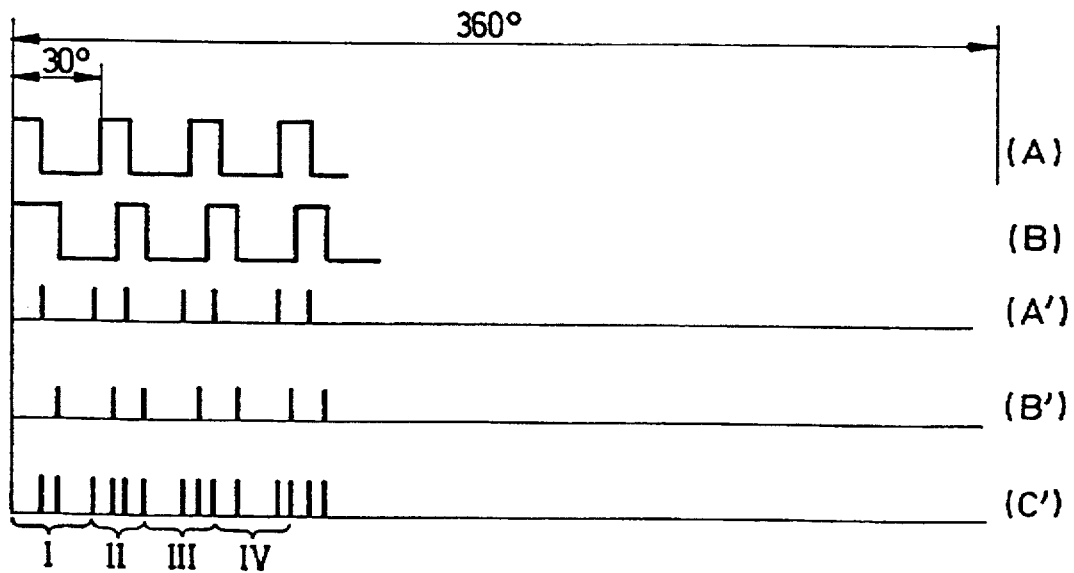
FIG. 4 shows pulses into which the two analog output signals in FIG. 3 are converted by triggering and digitization.
Figure 5:
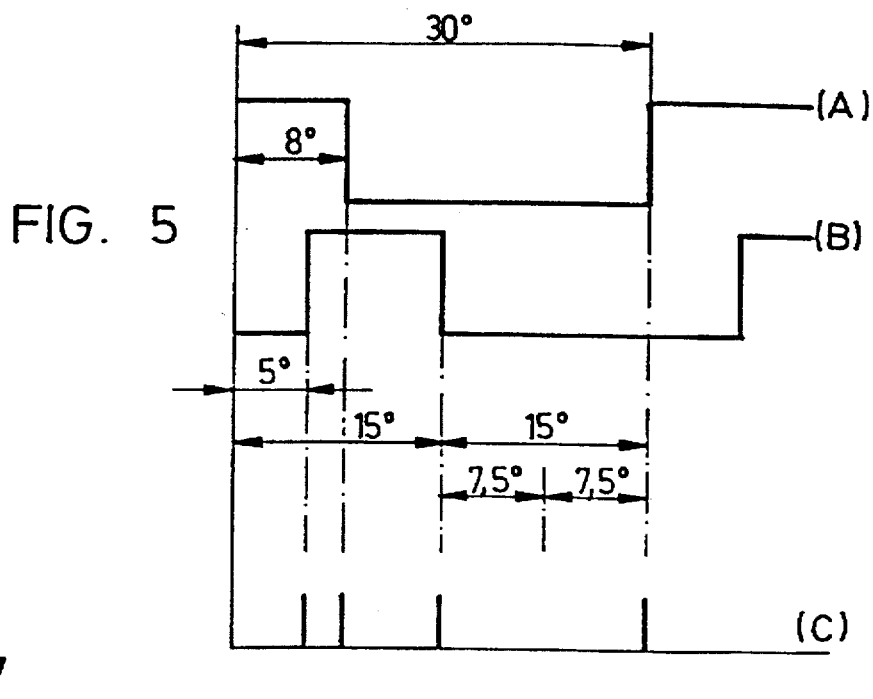
FIG. 5 is a portion on an enlarged scale from the pulse configurations shown in FIG. 4.

The two output signals A and B are put into rectangular form by means of known circuits (not shown), FIG. 4 showing the two corresponding rectangular signals indicated at (A) and (B). Pulses which are at given angular spacings from each other are produced from the rising edges and the falling edges of the two rectangular signals. It is assumed in FIGS. 4 and 5 that the rotary member 5, more specifically the electric motor armature, has twelve poles. An angular region of 30° is associated with each pole. FIG. 4 shows in respect of successive poles the rectangular signals (A) and (B) which are derived from the sensor output signals. FIG. 5 is a view on an enlarged scale of portions of the rectangular voltage signals for a pole, that is to say for a rotary angle of 30° in respect of the periphery of the rotary member 5. Thus, for each pole or for each rotary angle region, four pulses which are shown in FIG. 5 in the pulse series (C) are produced from the respective rising and falling edges of the first and second rectangular signals (A) and (B). The pulses of the pulse series (C) are also at given angular spacings from each other, in dependence on the angular spacing of the first and second sensors 6 and 7 from each other. As shown in FIG. 5, starting from an angular position 0, the pulses of the pulse series (C) occur at angular positions of 5°, 8°, 15°, 30°. For the next following pole of the rotary member 5, there are then once again four pulses of a pulse series (C), with the same sequence of angular spacings.

Figure 2:
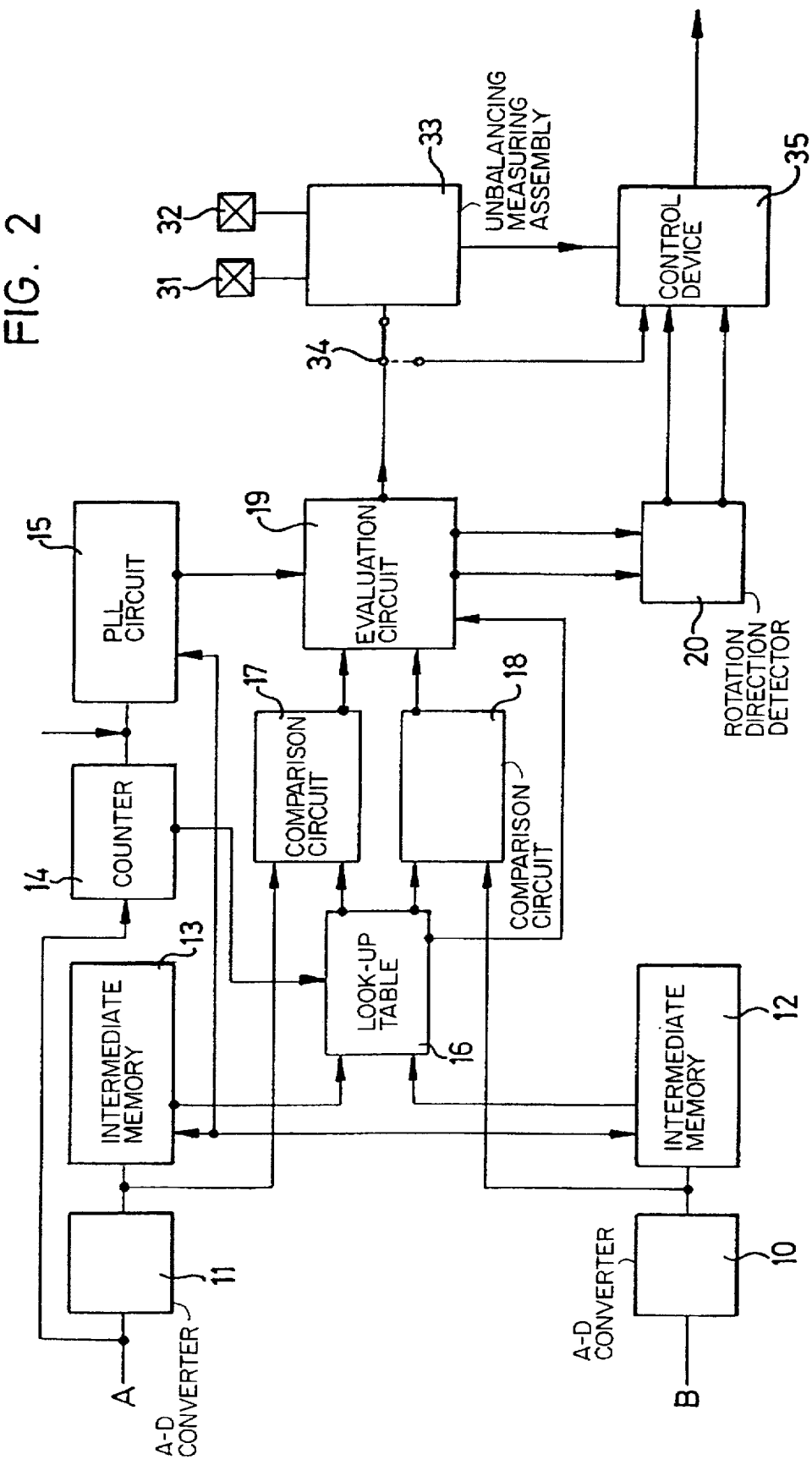
FIG. 2 shows a block circuit diagram of an evaluation means for the output signals produced by the sensors of the structure shown in FIG. 1.

Looking now at FIG. 2, that digitization operation is effected in respect of the output signal A of the sensor 7 by means of an analog-digital converter 11 and in respect of the output signal B of the sensor 6, by means of an analog-digital converter 10. The analog-digital converter 11 supplies the pulse train identified by (A') in FIG. 4 while the analog-digital converter 10 supplies the pulse train shown at (B') in FIG. 4. Those two pulse trains (A') and (B') are applied to a look-up table memory 16 by way of intermediate memories 12 and 13 in which they may each be individually stored. In the look-up memory 16, the pulse trains are stored either individually in the form of the pulse trains (A') and (B') and/or in the form of a pulse train (C') which is combined from those two pulse trains.

It will be seen from FIGS. 4 and 5 and more especially from the pulse train (C) or (C') that it is possible by means of the first and second sensors 6 and 7 to achieve a higher degree of angular resolution when determining the respective rotary angular position of the rotary member 5. That is the case whenever the angular spacing between the first and second sensors 6 and 7 is either smaller than the angular distance over which a respective pole piece 30 extends, or when the sensors are at an angular spacing from each other, which differs from the angular spacing of the successive pole pieces 30 from each other, or a multiple of that pole piece angular spacing. If the electric motor armature has twelve pole pieces, they are disposed at angular spacings from each other of 30°. The sensors 6 and 7 are therefore to be disposed in such a fashion that they differ from that angular spacing (30°) or a multiple thereof. It will be seen therefore from the configurations in FIGS. 4 and 5 that suitable selection in respect of the angular spacings involved also makes it possible to achieve relatively uniform distribution of the pulses in the pulse trains concerned.

When dealing with an electric motor armature having twelve pole pieces and when the apparatus has the first and second sensors 6 and 7 disposed at an angular spacing of 5°, as is assumed to be the case in FIG. 5, it is possible to achieve a degree of angular resolution, in determining the rotary angular position of the rotary member, which has an error of a maximum of only 7.5°. It will be appreciated here that it is also possible to attain higher levels of resolution or smaller errors if that should be required. As already indicated above, that can be achieved for example by the sensors 6 and 7 being suitably displaced relative to each other in order for them to be at the optimum angular spacing from each other, depending on the number and configuration of the pole pieces of the electric motor armature.

The pulses of the pulse series (C') indicated in FIG. 5 may be arranged, for each full revolution of the rotary member 5 (through 360°) in twelve pulse groups I, II, III . . . XII associated with the respective twelve pole pieces. They are arranged in the look-up table memory 16 in that order.

A counting operation in respect of the pole pieces 30 may be carried out during the rotary movement of the rotary member 5, by means of the output signal from one of the first and second sensors 6 or 7 (output signal A or B). That pole counting operation is performed in a counter indicated at 14 in FIG. 2. In the FIG. 2 circuitry, the counter 14 for receiving the signals A is connected to the output of the amplifier 8 associated with the sensor 7, as shown in FIG. 3. An additional pulse is produced in each full revolution. That additional pulse can be achieved by the counter 14 beginning to count afresh again after each full revolution of the rotary member 5, with for example the first count pulse (resetting or start pulse) indicating the zero position of the angle of rotation or the beginning of a fresh revolution of the rotary member. That mode of operation for producing a zero phase reference signal is disclosed in German specification No 2 243 002 to which reference is therefore directed for the purposes of this description. It is also possible however for that respective pulse/revolution to be obtained from a marking which also rotates with the rotary member 5.

As shown in FIG. 2, the counter 14 is also connected to the look-up table memory 16 so that the respective groups of pulses in the pulse series (C') which is shown in FIG. 4 can be attributed to the respectively associated pole pieces. The counter 14 and the respective pulse produced in each revolution can be connected to an evaluation circuit 19 either directly or, as shown in FIG. 2, by way of a PLL-circuit 15 which in each revolution produces 360 pulses which are each associated with a degree of angle. Outputs of first and second comparison circuits 17 and 18 are also connected to the evaluation circuit 19. The first inputs of the first and second comparison circuits 17 and 18 are connected to outputs of the look-up table memory 16 while the second input of the comparison circuit 17 is connected to the output of the analog-digital converter 11 which provides the pulse train (A') shown in FIG. 4. The second input of the comparison circuit 18 is connected to the output of the analog-digital circuit 10 which supplies the pulse train (B') shown in FIG. 4.

The illustrated operation of angular division in respect of the rotary member 5 can be effected during a measuring run during which the unbalance at the rotary member 5 is measured in the arrangement illustrated in FIG. 1. At the same time, while that is going on, the angle signal which is supplied by the evaluation circuit 19 and which specifies the respective angular position of the rotary member 5 during the measuring run can be used to determine the angular position of the unbalance on the rotary member. For that purpose the output of the evaluation circuit 19 is connected by way of a change-over switch 34 to an electronic measuring assembly 33 of the unbalance measuring arrangement. The electronic unbalance measuring assembly 33 is of a known design configuration, as disclosed for example in Hofmann News 5 'Messverfahren und Messgerate der Hofmann-Auswuchtmaschinen' ['Measuring methods and equipment in the Hofmann balancing machines'], imprint 09.85 D. The electronic unbalance measuring assembly 33 is connected to the first and second measurement value sensors 31 and 32 which, as described above, may be suitably disposed at the two mountings 1 and 2 of the FIG. 1 structure. The unbalance of the rotary member 5 is ascertained in respect of magnitude and angular position, during the measuring run, on the basis of the measurement signals produced by the measurement value sensors 31 and 32, by means of the unbalance measuring assembly 33. Those parameters in respect of the detected unbalance of the rotary member are stored in a memory provided in the electronic unbalance measuring assembly 33, for the subsequent operation of turning the rotary motor 5 into the appropriate position for compensating for any unbalance thereof. For that operation, the rotary member is to be disposed in such a position that the parts thereof at which an unbalance compensating operation, or balancing operation, is to be carried out, are disposed in opposite relationship to appropriate tools such as grinding or milling tools. In the case of an electric motor armature for example, the parts at which the balancing operation is to be performed will be the appropriate pole pieces 30. The rotary member will therefore have to be turned into the appropriate position for permitting the balancing operation to be suitably carried out.

The step of rotating the rotary member 5 into the appropriate position for balancing thereof takes place at low speed. The speed involved is significantly lower than the measuring speed in order to ensure that the rotary member can be stopped in the appropriate balancing position, without involving slippage which would almost inevitably occur if the attempt were to be made to stop the rotary member from a high speed. In order to initiate the step of turning the rotary member into the appropriate balancing position, immediately after termination of the measuring run or the measuring period, while the rotary member is continuing to rotate, the change-over switch 34 for example is switched over so that the output of the evaluation circuit 19 is now connected to an input of a control device 35 for controlling the rotary movement of the rotary member into its balancing position. The control device 35 can also be designed in known fashion and will therefore not be described in greater detail herein, and may have counter and comparison devices with which the angle signals supplied by the evaluation circuit 19 and the electronic unbalance measuring assembly 33 are compared together. When the balancing angular position which is stored in the electronic measuring assembly 33, coincides with the current angular position of the rotary member 5 which is produced by the evaluation circuit 19, when the rotary member 5 is being turned into the appropriate position for balancing thereof, having regard to the position of the balancing tools, the rotary member 5 is stopped to permit the balancing operation to be carried out. During the operation of slowly rotating the rotary member 5 in that way, which takes place immediately after the measuring run while the motor is still rotating and thus with the same reference angle position (zero position) on the rotary member 5, the pulse groups associated with the respective pole pieces 30 are still produced during each revolution of the rotary member, in the manner already described hereinbefore. The comparison circuits 17 and 18 which are connected to the outputs of the analog-digital converters 10 and 11 and the two outputs of the look-up table memory 16 provide for association of the respective current angle position, providing multiple angle division for each pole, as already discussed above. The respective current angle position is indicated at the output of the evaluation circuit 19 connected to the comparison circuits 17 and 18, in the form of a corresponding angle position signal. That current angle position signal is compared to the angle signal supplied by the unbalance measuring assembly 33, in the control device 35. By way of a device 20 for detecting the direction of rotation of the rotary member, which is connected by way of first and second inputs thereof to the evaluation circuit 19 and the output of which is also connected to the control device 35, the drive motor of the unbalance measuring structure shown in FIG. 1 is actuated in such a way that the rotary member 5 is moved into the appropriate balancing position at low speed so that the pole piece or pieces 30 at which material is to be removed to balance the rotary member 5 is or are disposed opposite the balancing tools. The balancing operation can then be carried out for example in the manner shown in Hofmann News 14 'Automatische Auswuchtung von Elektromotorenankern' ['Automatic balancing of electric motor armatures'], to which reference is therefore directed, by means of for example milling tools.

Figure 6:
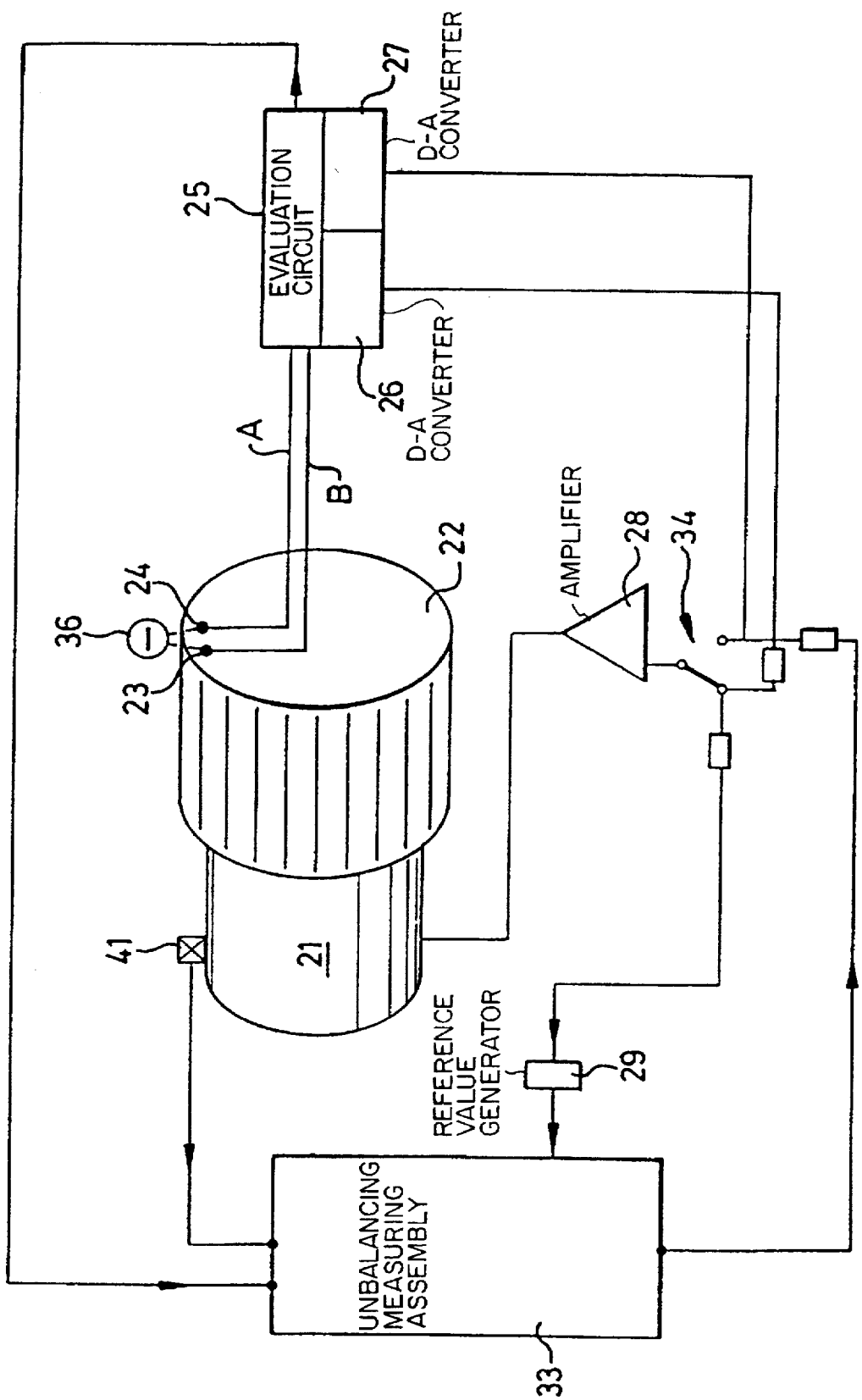
FIG. 6 is a diagrammatic view of a further unbalance measuring arrangement for a rotary member which is coupled to an electric motor, also comprising first and second sensors for sensing the surface of the rotary member.

Looking now at FIG. 6, the apparatus illustrated therein is an unbalance measuring arrangement for measuring unbalance on rotary members such as fan wheels or impellers which are rigidly connected to an armature of an electric motor. That arrangement is also suitable for rotary members which are provided with their own drive.

Figure 7:
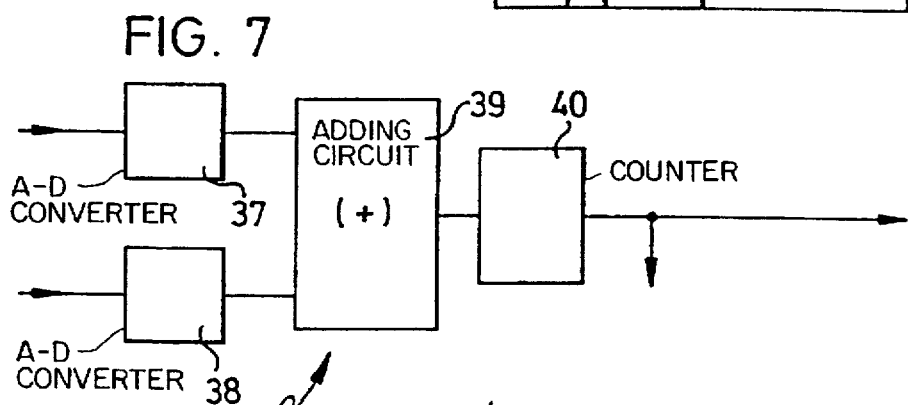
FIG. 7 shows a block circuit diagram for the evaluation circuit of the arrangement shown in FIG. 6.
Figure 8:
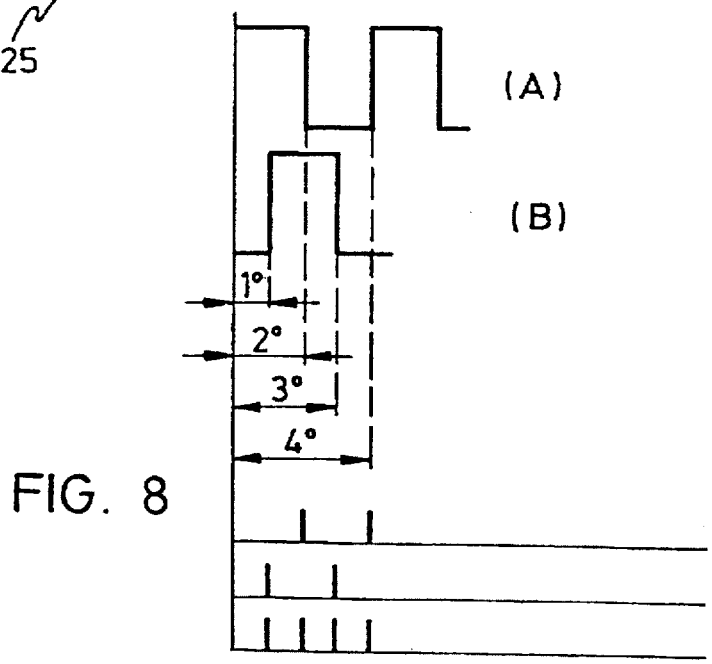
FIG. 8 shows pulses which are produced by the circuit illustrated in FIG. 7.

A rotary member which is indicated at 22 in FIG. 6 and which is for example in the form of a fan wheel or impeller, for example for a fan or blower used in a motor vehicle, is fixedly connected to the armature of an electric motor 21. The rotary member 22 is sensed by means of a light source 36 and first and second photoelectric sensors 23 and 24. It will be appreciated that, in place of the first and second photoelectric sensors 23 and 24, it is also possible to use other sensors which have a sensing action in a non-contact mode, for example inductively sensing measurement value generators. During the rotary movement of the rotary member 22 and in particular during an unbalance measuring run, the light beams directed on to the photoelectric sensors 23 and 24 are alternately masked by the blades of the rotary member and transmitted in the spaces between the blades. In dependence thereon, the sensors 23 and 24 produce output signals which are converted into a rectangular shape and then, as in the first embodiment described above, into pulses corresponding to the rising and falling edges. The angular spacings of the photoelectric sensors 23 and 24, relative to the angular spacings of the blades of the rotary member, may be such that the spacings of the pulses correspond to a degree of angle. An evaluation circuit 25 to which output signals A and B from the sensors 23 and 24 are applied may include analog-digital converters which are indicated at 37 and 38 in FIG. 7, in the seine fashion as in the case of the circuit shown in FIG. 2. The converters 37 and 38 form from the rising and falling edges of the rectangular signals indicated at (A) and (B) in FIG. 8, pulse trains which in an adding circuit indicated at 39 in FIG. 7 are combined to form a continuous pulse train as shown in FIG. 8. The pulses supplied by the adding circuit 39 are counted in a counter shown at 40 in FIG. 7. In each revolution of the rotary member 22, the counter 40 begins to count afresh so that the resetting or initial pulse acts in each case as a zero degree angular position or reference angular position. It is also possible however for a reset pulse to be supplied to the counter 40 to cause it to begin counting again in each revolution, from the exterior, for example caused by a marking which rotates with the rotor 22. As can be seen from FIG. 8, the angular spacing of the individual pulses (in the lower pulse train) is 1° in each case. That pulse train can be evaluated as an angle signal. The pulse train can also be evaluated as a rotary speed signal.

During the unbalance measuring run, the pulse train which indicates the respective rotary angular position of the rotor is formed (1°/pulse). That pulse train can be evaluated for allocation of the angular position of the unbalance, with respect to the rotary member 22. The unbalance is detected by a measuring procedure in a similar fashion to the situation involving operational balancing (see Hofmann-Info 9 'Rechnergestutztes Betriebsauswuchten' ['Computeraided operational balancing']), by the application of one or more measurement value generators 41, for example to the casing of the electric motor 21. The output signals of the generator 41 are transmitted to the electronic unbalance measuring assembly 33 and evaluated in known fashion, having regard to the measuring speed of rotation which is supplied for example by the reference value generator 29. The unbalance of the rotary member is ascertained in respect of magnitude and angular position and those parameters ere stored in the electronic unbalance measuring assembly 33 for the subsequent balancing operation. During the unbalance measuring run, the rotary speed can be continuously regulated to the measuring speed established by the reference value generator 29, by way of a digital-analog converter indicated at 26 in FIG. 6. For that purpose a suitable reference value signal is supplied by the reference value generator 29 and an actual rotary speed signal is supplied by way of the digital-analog converter 26. Those two signals ere applied to a servo amplifier indicated at 28 in FIG. 6 during the unbalance measuring run. The amplifier 28 suitably actuates the electric motor 21.

When the rotary member is being turned into the appropriate position for balancing thereof, the change-over switch 34 is moved into the appropriate position (at the right in FIG. 6). An unbalance angle signal corresponding to the stored unbalance angular position is then supplied by the electronic unbalance measuring assembly 33. An angle signal corresponding to the respective angular position of the rotary member 22 is also supplied by way of a digital-analog converter 27 from the evaluation means 25. That angle signal is derived from the counter condition supplied by the counter 40. The unbalance angle signal and the angle signal produced by the digital-analog converter 27 ere evaluated in the servo amplifier 28 and the electric motor 21 is suitably actuated, in such a way that the rotary member 22 is stopped in the desired balancing angular position, in dependence on the angular position of the unbalance on the rotary member.

It will be appreciated that the above-described method and apparatus in accordance with the principles of the present invention have been set forth solely by way of example and illustration thereof and that various modifications and alterations may be made therein without thereby departing from the spirit and scope of the present invention.

What is claimed is:

1. A method of determining the rotary angular position of a segmented rotary member when measuring the unbalance of said segmented rotary member, said segmented rotary member having a plurality of segments, said method comprising the steps of:

determining an angular position of a measured unbalance of said segmented rotary member;

a first sensing step in which each of said plurality of segments of the segmented rotary member are sensed from a first sensing position in succession with respect to time during an unbalance measuring run;

a second sensing step in which each of said plurality of segments of the segmented rotary member are sensed from a second sensing position in succession with respect to time during the unbalance measuring run, said second sensing step occurring simultaneously with said first sensing step, said first and second sensing positions being spaced apart by an angular distance comprising a distance which is less than an angular distance subtended by each of said plurality of segments plus an integer multiple of an angular distance between corresponding points on adjacent ones of said plurality of segments;

forming, in each revolution of the segmented rotary member, first and second angle signals during said first and second sensing steps, respectively, lack of said first and second angle signals having characteristic to each of said plurality of segments of the segmented rotary member and an angular spacing between each of said plurality of segments, said first and second angle signals being phase shifted from one another with respect to time;

storing the first and second angle signals having regard to the phase shifted spacing between said first and second angle signals;

evaluating the first and second angle signals; and rotating the rotary member into an angular balancing position for a balancing operation in response to said evaluation step and in dependence on the measured angular position of unbalance.

2. A method as set forth in claim 1 comprising the additional step of converting said first and second angle signals to form pulses which correspond to shorter angular distances related to the segmented rotary member than are predetermined by each of said plurality of segments of said segmented rotary member sensed to form the first and second angle signals.

3. A method as set forth in claim 1 wherein said rotating step includes turning the segmented rotary member into an angular position for balancing said segmented rotary member, wherein the starch signals having characteristic corresponding to the angular spacing between each of said segments of the segmented rotary member are compared to current angle signals obtained by sensing said plurality of segments of the segmented rotary member to determine a current angular position of the segmented rotary member during the turning of the segmented rotary member into said angular position for the balancing operation.

4. A method as set forth in claim 3 for said rotary member which permits a balancing operation to be performed thereon only at predetermined balancing locations, wherein said balancing locations on the rotary member are sensed to form said first and second angle signals.

5. A method as set forth in claim 3 for said segmented rotary member which in use is driven by an electric motor, said electric motor having an armature, wherein the operation of determining said angular position of unbalance is carried out in the balancing operation with the armature of the electric motor and the rotary member coupled together.

6. Apparatus for determining the rotary angle position of a rotary member in an unbalance measuring arrangement, said rotary member having a plurality of circumferentially spaced features extending over an outer surface of said rotary member, said apparatus comprising:

means for rotatably mounting said rotary member;

first and second sensors positioned adjacent said rotary member having an angular spacing therebetween sufficient for each of said sensors to produce first and second rotational angle signals, respectively, related to each of said plurality of features and for each of said plurality of features in response to rotation of said rotary member during each revolution thereof said angular spacing comprising a distance which is less than an angular distance over which each of said plurality of features extends;

storage means for storage of the first and second rotational angle signals produced by each of said first and second sensors during an unbalance measuring run; and evaluation means connected to the storage means and to said sensors for comparison of the stored angle signals to current angle signals supplied by said first and second sensors when the rotary member is being turned to a desired balancing position.

7. Apparatus as set forth in claim 6 wherein the storage means comprises a look-up table storage device for receiving said first and second rotational angle signals from the first and second sensors, respectively, in digitized form during said unbalance measuring run and holding said signals ready for comparison during the rotary angle position determining operation.

8. Apparatus as set forth in claim 6 wherein the angular spacing between the first and second sensors comprises a distance which is less than the angular spacing between corresponding points on each of said plurality of features on the rotary member plus a distance which is an integer multiple of the angular spacing between said features of said rotary member.

9. Apparatus as set forth in claim 6 for the rotary member which is driven by an electric motor, said electric motor having an armature, the apparatus including an evaluation means connected to said first and second sensors and having an output device for producing an angle output signal, means for detecting unbalance of the rotary member and for producing an unbalance angle signal corresponding thereto, and a servo amplifier for receiving the angle output signal from the evaluation means and said unbalance angle signal, said servo amplifier, in response to said angle output signal and said unbalance angle signal, actuating said electric motor to rotate the armature of the electric motor and the rotary member coupled thereto into a balancing position.

10. The apparatus of claim 6 wherein the first and second sensors are inductive transmitters.

* * * * *